US005454666A

United States Patent [19]
Chaback et al.

[11] Patent Number: 5,454,666
[45] Date of Patent: Oct. 3, 1995

[54] METHOD FOR DISPOSING OF UNWANTED GASEOUS FLUID COMPONENTS WITHIN A SOLID CARBONACEOUS SUBTERRANEAN FORMATION

[75] Inventors: Joseph J. Chaback; Dan Yee, both of Tulsa, Okla.

[73] Assignee: Amoco Corporation, Chicago, Ill.

[21] Appl. No.: 226,454

[22] Filed: Apr. 12, 1994

Related U.S. Application Data

[63] Continuation-in-part of Ser. No. 222,743, Apr. 1, 1994.

[51] Int. Cl.$^6$ .............................. A62D 3/00; B01D 53/02
[52] U.S. Cl. ..................... 405/52; 166/265; 166/305.1; 405/128; 588/250
[58] Field of Search ................... 166/252, 265, 166/266, 268, 305.1; 405/52, 53, 54, 59, 128; 588/250

[56] References Cited

U.S. PATENT DOCUMENTS

| | | | |
|---|---|---|---|
| 4,043,395 | 8/1977 | Every et al. | 166/263 |
| 4,283,089 | 8/1981 | Mazza et al. | 299/16 |
| 4,400,034 | 8/1983 | Chew | 299/5 |
| 4,446,921 | 5/1984 | Coenen et al. | 166/267 |
| 4,544,037 | 10/1985 | Terry | 166/369 |
| 4,756,367 | 7/1988 | Puri et al. | 166/263 |
| 4,883,122 | 11/1989 | Puri et al. | 166/263 |
| 5,014,785 | 5/1991 | Puri et al. | 166/263 |
| 5,014,788 | 5/1991 | Puri et al. | 166/308 |
| 5,085,274 | 2/1992 | Puri et al. | 166/252 |
| 5,099,921 | 3/1992 | Puri et al. | 166/266 |
| 5,133,406 | 7/1992 | Puri | 166/266 |
| 5,147,111 | 9/1992 | Montgomery | 299/16 |
| 5,332,036 | 7/1994 | Shirley | 166/268 |

FOREIGN PATENT DOCUMENTS 609917  6/1978  U.S.S.R. .

OTHER PUBLICATIONS

Letter of Nov. 22, 1993 from the State of New Mexico Energy, Minerals and Natural Resources Department to Amoco Production Company, Re: "Injection Pressure Increase Florence S" Gas Com No. 7-A, San Juan County, N.M.

Letter of Oct. 21, 1993 from Amoco Production Company to the New Mexico Oil Conservation Division, Re: "Basin Fruitland Carbon Dioxide Pilot Project Increased Surface Injection Pressure Limit Rule 6 and 7", Order No. R-9948 Florence 'S' Gas Com Well No, 7A N/2 Section 23, T30N-R9W San Juan County, N.M.

State of New Mexico Energy, Minerals, and Natural Resources Department Oil Conservation Division, Order No. R-9948, Re: "Application of Amoco Production Company for a CO2 Injection Pilot Project and an Exception to Rule No. (4), Order No. R-8768," As Amended, San Juan County, N.M. (Aug. 30, 1993).

Amoco Production Company NMOCD Hearing Apr. 8, 1993, Case No. 10707, Exhibit No. 1-A.

Letter of May 3, 1993 from Campbell, Carr, Berge and Sheridan, P. A. to the Oil Conservation Division, New Mexico Department of Energy, Minerals and Natural Resources, Re: "Oil Conservation Division Case 10707: Application of Amoco Production Company for a CO2 Injection Pilot Project and an Exception to Rule 4, Order No. R-8768-A, San Juan County, N.M.".

Letter of Mar. 15, 1992 from J. W. Hawkins, Amoco Production Company, to the New Mexico Oil Conservation Division, File: CAW-059-986.511, Re: "Application for Hearing Approval of CO2 Injection Pilot Project and Exception to Rule 4, Order No. R-8768-A for Second Well on 320 Acre Spacing Unit W/2 Section-23, T30N-R9W Basin Fruitland Coal Gas Pool, San Juan County, N.M.".

M. G. Zabetakis, et al., "Methane Control in United States Coal Mines—1972", U. S. Bureau of Mines, Information Circular 8600, pp. 8–16, (1973).

R. S. Metcalfe, D. Yee, J. P. Seidle, and R. Puri, "Review of Research Efforts in Coalbed Methane Recovery", SPE 23025, (1991).

R. M. Rotty, "A Perspective on The Greenhouse Effect and $CO_2$ Flue Gas Recovery for EOR", U.S. Department of Energy & Argonne National Lab Recovery and Use of Waste $CO_2$ in Enhanced Oil Recovery Workshop, proceedings pp. 39–57, (Jun. 1988).

R. S. Park, "Description of a North Sea $CO_2$ Enhanced Oil Recovery Project", U.S. Department of Energy & Argonne National Lab Recovery & Use of Waste $CO_2$ in Enhanced Oil Recovery Workshop, proceedings pp. 11–20, (Jun. 1988).

R. Puri and D. Yee, "Enhanced Coalbed Methane Recovery", SPE 20732, (1990).

Edwin P. Hyde, "Recovery of $CO_2$ from Flue Gas", a paper presented at the Gas Processors Assoc., Permian Basin Chapter, Regional Meeting, (May 5, 1983).

Alan A. Reznik, Pramod K. Singh and William L. Foley, "An Analysis of the Effect of Carbon Dioxide Injection on the Recovery of In–Situ Methane from Bituminous Coal: An Experimental Simulation", SPE/DOE 10822, (1982).

R. T. Ellington, et al., "Scrubbing $CO_2$ from Plant Exhausts Provides Economic Sources of Gas for EOR Projects", *Oil & Gas Journal*, pp. 112–114, 119–120, 124, (Oct. 15, 1984).

George P. Stoeppelwerth, "Exhaust Gas Provides Alternative Gas Source for Cyclic EOR", *Oil & Gas Journal*, pp. 69–69, (Apr. 26, 1993).

"Amoco $CO_2$ Pilot Seeks to Increase Coalbed Gas Flow", *Oil & Gas Journal*, p. 33, (Dec. 27, 1993).

(List continued on next page.)

*Primary Examiner*—George A. Suchfield
*Attorney, Agent, or Firm*—Charles P. Wakefield; Robert E. Sloat

[57] ABSTRACT

A method for disposing of unwanted gaseous fluid components, such as carbon dioxide, oxides of nitrogen, hydrogen sulfide, and oxides of sulfur within a solid carbonaceous subterranean formation, such as a coal seam. The unwanted gaseous fluid components are typically contained in a gaseous process effluent stream which is introduced into the formation.

22 Claims, No Drawings

OTHER PUBLICATIONS

A. V. Astakhov and D. L. Shirochin, "Capillary–Like Condensation of Sorbed Gases in Coals", *Fuel*, vol. 70, pp. 51∝56, (Jan. 1991).

B. D. Hughes and T. L. Logan, "How to Design a Coalbed Methane Well", *Petroleum Engineer International*, pp. 16–20, (May 1990).

Anthony E. DeGance, "Multicomponent High–Pressure Adsorption Equilibria on Carbon Substates: Theory and Data", *Fluid Phase Equilibria*, vol. 78, pp. 99–137, Elsevier Science Publishers B. V., Amsterdam, (1992).

S. Harpalani and U. M. Pariti, "Study of Coal Sorption Isotherms Using a Multicomponent Gas Mixture", a paper presented at the 1993 International Coalbed Methane Symposium, University of Alabama/Tuscaloosa, (May 17–21, 1993).

Paul F. Fulton, "A Laboratory Investigation of Enhanced Recovery of Methane from Coal by Carbon Dioxide Injection", SPE/DOE 8930, (1980).

Alan A. Reznik, et al., "Enhanced Recovery of In–Situ Methane by Carbon–Dioxide Injection: An Experimental Feasibility Study", a report by the Chemical and Petroleum Engineering Department, University of Pittsburgh, for the U.S. Department of Energy, Office fo Fossil Energy, Morgantown Energy Technology Center, DOE/MC/14262–1732 (DE85003352), (May 1982).

Dan Yee, et al., "Gas Sorption on Coal and Measurement of Gas Content", *Hydrocarbons from Coal*, Chap. 9, pp. 203–218, The American Assoc. of Petroleum Geologists, Tulsa, Okla., (1993).

L. E. Arri, et al., "Modeling Coalbed Methane Production with Binary Gas Sorption", SPE 24363, (1992).

D. S. Arnold, et al., "$CO_2$ Can Be Produced from Flue Gas", *Oil and Gas Journal*, pp. 130–136, (Nov. 22, 1982).

N. Ali, et al., "Injection Above–Parting–Pressure Waterflood Pilot, Valhall Field, NOrway", SPE 22893, (1991).

Carl L. Schuster, "Detection Within the Wellbore of Seismic Signals Created by Hydraulic Fracturing", SPE 7448, (1978).

Donald H. White, Jr. and P. Glenn Barkley, "The Design of Pressure Swing Adsorption Systems", *Chemical Engineering Progress*, pp. 25–33, Jan. 1989).

Mark W. Ackley and Ralph T. Yang, "Kinetic Separation by Pressure Swing Adsorption: Method of Characteristics Model", *AIChE Journal*, vol. 36, No. 8, pp. 1229–1238, (1990).

Douglas. M. Ruthven, "Principles of Adsorption and Adsorption Processes", A Wiley–Interscience Publication, John Wiley & Sons, pp. 359–375, (1984).

H. S. Shin and K. S. Knaebel, "Pressure Swing Adsorption: An Experimental Study of Diffusion–Induced Separation", *AIChE Journal*, vol. 34, No. 9, pp. 1409–1416, (1988).

S. Farooq and D. M. Ruthven, "Effect of Equilibrium Selectivity in a Kinetically Controlled PSA Separation", *Chemical Engineering Science*, vol. 47, No. 8, pp. 2093–2094, (1992).

METHOD FOR DISPOSING OF UNWANTED GASEOUS FLUID COMPONENTS WITHIN A SOLID CARBONACEOUS SUBTERRANEAN FORMATION

RELATED APPLICATION

This application is a continuation-in-part of U.S. patent application Ser. No. 08/222,743, filed Apr. 1, 1994.

FIELD OF THE INVENTION

The present invention relates to methods for disposing of unwanted gaseous fluid components within a solid carbonaceous subterranean formation.

BACKGROUND OF THE INVENTION

Numerous industrial processes discharge streams which contain a mixture of various gaseous fluids. There is increasing concern that some of the constituents of the effluent streams may cause significant environmental problems, and that these streams therefore should not be released into the atmosphere. Carbon dioxide is a compound which is a constituent of many of the effluent streams released from industrial processes and whose release into the atmosphere is causing increasing concern.

It is hypothesized that carbon dioxide released into the atmosphere acts as a green-house gas and that too high a concentration of green-house gases in the atmosphere will cause global warming. In response to this potential threat, many governmental bodies have either enacted or plan to enact regulations limiting the quantity of carbon dioxide which can be released into the atmosphere. These regulations can hamper many industries because the combustion of virtually any hydrocarbon fuel with air produces an effluent containing carbon dioxide, nitrogen, and gaseous combustion products.

The mixture of gases which results from the combustion of a hydrocarbon with oxygen or air is hereinafter referred to as "flue gas." The chemical composition of flue gas depends on many variables, including but not limited to, the combusted hydrocarbon, the combustion process oxygen-to-fuel ratio, and the combustion temperature. In addition to carbon dioxide and nitrogen, flue gas may contain compounds such as, carbon monoxide, oxides of sulfur, oxides of nitrogen, and other constituents. The release of these compounds to the atmosphere also is coming under increasing public scrutiny and is the subject of increasing governmental regulation.

There are several types of commercially available systems which may be used for removing carbon dioxide from gas streams. One of the most commonly-used systems utilizes a selective amine absorption solution to strip the carbon dioxide from the gas stream. Unfortunately, this type of system will not tolerate high levels of particulates or oxides of sulfur. Particulates cause plugging, contamination, and erosion or corrosion of the treating process, while oxides of sulfur, such as sulfur dioxide ($SO_2$), react irreversibly with the amine solution utilized in the system to form non-regenerable by-products. Therefore, if particulates or oxides of sulfur are present, extra process steps are required to remove the oxides of sulfur and particulates prior to stripping the carbon dioxide from a gas stream. These extra process steps add complexity and cost to the system.

In addition to being a hydrocarbon combustion product, carbon dioxide can be produced by natural processes and released to the environment during a non-combustion process. For example, carbon dioxide is produced by the thermal and biogenic processes which are believed to form hydrocarbons such as oil, natural gas, or coal. Carbon dioxide often is recovered with these hydrocarbons and released to the atmosphere by various post-production steps.

The increasing concern over the atmospheric release of carbon dioxide and other compounds demands methods by which to dispose of the deleterious compounds. Preferably, the methods should be capable of disposing of both carbon dioxide and other contaminants together, without the need to use a process step to dispose of carbon dioxide and another separate process step to dispose of other contaminants, such as oxides of sulfur and oxides of nitrogen.

As used herein, the following terms shall have the following meanings:

(a) "cleats" or "cleat system" is the natural system of fractures within a solid carbonaceous subterranean formation;

(b) a "coalbed" comprises one or more coal seams in fluid communication with each other;

(c) "formation parting pressure" and "parting pressure" mean the pressure needed to open a formation and propagate an induced fracture through the formation;

(d) "reservoir pressure" means the pressure of a formation near a well during shut-in of that well. The reservoir pressure can vary throughout the formation. Also, the reservoir pressure of the formation may change over time as gaseous fluid is injected into the formation and fluids are produced from the formation;

(e) "solid carbonaceous subterranean formation" refers to any substantially solid carbonaceous, methane-containing material located below the surface of the earth. It is believed that these methane-containing materials are produced by the thermal and biogenic degradation of organic matter. Solid carbonaceous subterranean formations include but are not limited to coalbeds and other carbonaceous formations such as antrium, carbonaceous, and devonian shales. The formations utilized by the invention include formations which are depleted of recoverable methane;

(f) "preferentially sorbing", "preferentially sorbs", and "preferential sorption" refer to processes which occur within a solid carbonaceous subterranean formation that alter the relative proportions of the components of a gaseous fluid. These processes may alter the relative proportions of the components of a gaseous fluid by equilibrium separation, kinetic separation, steric separation, and/or any other physical or chemical processes or combination of processes which within a solid carbonaceous subterranean formation will selectively alter the relative proportions of the components of a mixture of gaseous fluids. Within the formation, the gases sorbed to the carbonaceous material of the formation will be enriched in relatively stronger adsorbing fluid components;

(g) "sorption" refers to a process by which a gas is held by a carbonaceous material, such as coal, which contains micropores. The gas is held on the carbonaceous material in a condensed or liquid-like phase within the micropores, or the gas may be chemically bound to the carbonaceous material.

(h) "flue gas" refers to the gaseous fluid mixture which results from the combustion of a hydrocarbon with oxygen or air. The composition of flue gas depends on many variables, including but not limited to, the combusted hydrocarbon, the combustion process oxygen-to-fuel ratio, and the combustion temperature.

SUMMARY OF THE INVENTION

One object of the invention is to provide a method for disposing of unwanted gaseous fluids within a solid carbonaceous subterranean formation.

Another object of the invention is to provide a method for disposing of unwanted gaseous fluids within a solid carbonaceous subterranean formation that has been at least partially depleted of recoverable methane.

A more specific object of the invention is to provide a method for disposing of flue gas within a solid carbonaceous subterranean formation.

Yet another object of the invention is to provide a method for disposing of carbon dioxide within a solid carbonaceous subterranean formation.

The above objects of the invention are satisfied by the following embodiments of the invention.

One embodiment of the invention is a method for disposing of an unwanted gaseous fluid component within a solid carbonaceous subterranean formation, the method comprising the steps of:

a) introducing a gaseous fluid, comprising the unwanted gaseous fluid component, into the formation to sorb the unwanted gaseous fluid component to the formation; and b) maintaining disposal conditions within the formation to ensure that at least 10 percent of a disposal saturation level of an unwanted gaseous fluid component remains sorbed to the formation.

In a second embodiment of the invention, a method is disclosed for disposing of an unwanted gaseous fluid component within a coal seam, the method comprising the steps of:

a) introducing a gaseous fluid, containing the unwanted gaseous fluid component, into the coal seam; and b) ceasing to introduce the gaseous fluid into the coal seam when the coal seam becomes saturated to a desired degree with the unwanted gaseous fluid component.

In a third embodiment of the invention, a method is disclosed for disposing of an unwanted gaseous fluid component, the method comprising the step of: injecting a gaseous fluid, comprising the unwanted gaseous fluid component, into a coal seam which is at least partially depleted of methane under disposal conditions to cause the unwanted gaseous fluid component to sorb to the coal seam and to minimize the release of unwanted fluid component to the atmosphere.

The invention provides a means for disposing of large quantities of an unwanted gaseous fluid component within a solid carbonaceous subterranean formation. Some embodiments allow fluids such as flue gas, which may contain oxides of nitrogen, oxides of sulfur, carbon monoxide and carbon dioxide, to be disposed of within a solid carbonaceous subterranean formation without requiring separate processing systems for the carbon dioxide and the oxides of sulfur. Numerous other advantages and features of the present invention will become readily apparent from the following detailed description of the invention, the embodiments described therein, and the claims.

DESCRIPTION OF THE EMBODIMENTS

While this invention is susceptible of embodiment in many different forms, there will herein be described in detail, specific embodiments of the invention. It should be understood, however, that the present disclosure is to be considered an exemplification of the principles of the invention and is not intended to limit the invention to the specific embodiments illustrated.

Solid carbonaceous subterranean formations, such as coal seams, are comprised of carbonaceous material which includes a matrix having an extensive system of micropores, and a system of fractures which penetrate the matrix, commonly referred to as "cleats." The system of micropores provides a large internal surface area on which gaseous fluids can adsorb. The present invention exploits the ability of large quantities of unwanted gaseous fluid components to sorb to the micropores of a carbonaceous matrix.

The amount of any gaseous fluid which will sorb to the carbonaceous material of a formation is dependent in part on the relative adsorption strength of the gaseous fluid for the carbonaceous matrix, the capacity of the carbonaceous matrix for holding the gaseous fluid of interest, the tendency of the gaseous fluid molecules of interest to chemically react with the carbonaceous material and thereby chemisorb to the material, and the pressure and temperature present within the formation.

Injected Gaseous Fluid

In general, a gaseous fluid molecule that has a relatively stronger adsorption strength will preferentially sorb to the carbonaceous material of the formation over a gaseous fluid molecule that has a weaker adsorption strength. An important factor in the operation of the present invention is the relative adsorption strengths of the unwanted gaseous fluid component as compared to any other fluids which are introduced into the formation and to any other fluids, such as methane, which may already be present within the formation.

For a carbonaceous material such as coal, it is believed that the atmospheric boiling point of a fluid is indicative of the relative adsorption strength of the molecules or compounds which make up the fluid. Table 1 lists the atmospheric boiling point of several common fluids.

TABLE I

| Compound/Molecule | Boiling Point | |
|---|---|---|
| Helium (He) | −452° F. | Weaker Adsorption Strength |
| Hydrogen (H$_2$) | −423° F. | |
| Nitrogen (N$_2$) | −320.4° F. | |
| Carbon Monoxide (CO) | −313° F. | |
| Argon (Ar) | −303° F. | |
| Oxygen (O$_2$) | −297° F. | |
| Methane (CH$_4$) | −259° F. | |
| Nitric Oxide (NO) | −239.8° F. | |
| Xenon (Xe) | −162.5° F. | |
| Ethane (C$_2$H$_6$) | −127° F. | |
| Carbon Dioxide (CO$_2$) | −109° F. | |
| Sulfur Hexafluoride (SF$_6$) | −83° F. | |
| Hydrogen Sulfide (H$_2$S) | −75.28° F. | |
| Propane (C$_3$H$_8$) | −44° F. | |
| Sulfur Dioxide (SO$_2$) | 14° F. | |
| Nitrogen Dioxide (NO$_2$) | 70° F. | |
| Sulfur Trioxide (SO$_3$) | 112° F. | Stronger Adsorption Strength |

It is believed that, in general, the stronger adsorbing fluids have higher boiling points and the weaker adsorbing fluids have relatively lower boiling points. Therefore, the relative adsorption strength of the unwanted gaseous fluid component as compared to other gaseous fluids within the formation can be determined by comparing their relative atmospheric boiling points. For example, carbon dioxide, with an atmospheric boiling point of −109° F., is relatively more strongly adsorbing to carbonaceous material than methane or nitrogen, which have atmospheric boiling points of −259° F. and −320° F. respectively. The relative atmospheric boiling points of a fluid will provide one of ordinary skill in the art with general information relating to the relative adsorption strength of various gaseous fluids and thereby provide general information relating to the disposal of an unwanted gaseous fluid within a solid carbonaceous subterranean formation. However, the relative adsorption strength of various gaseous fluids on a particular carbonaceous material of interest and the quantity of an unwanted gaseous fluid which can adsorb to the material should be determined empirically where possible. The empirically data will allow the quantity of gaseous fluid which can be disposed of within a solid carbonaceous subterranean formation to be predicted more accurately. If chemisorption of a particular gaseous fluid component to the carbonaceous material of the formation is believed to be a significant factor, it also should be taken into account when determining the amount of unwanted gaseous fluid which can be disposed of within a formation.

In the invention, a gaseous fluid which contains the unwanted gaseous fluid component is introduced into a solid carbonaceous subterranean formation. The gaseous fluid is introduced into the formation through an injection well in fluid communication with the formation, preferably, through an injection well which penetrates the formation. The gaseous fluid is introduced into the formation at a pressure higher than the reservoir pressure of the formation and may be introduced into the formation in either a gaseous or liquid state. Preferably, the gaseous fluid is introduced at a pressure below the formation parting pressure of the formation. If the injection pressure is too high and the formation fractures, the injected gaseous fluid may leak out of the solid carbonaceous subterranean formation into surrounding formations. If a gaseous fluid is injected in a liquid state, it will change to a gaseous fluid at the pressures and temperatures prevalent within a typical solid carbonaceous subterranean formation. Alternatively, the gaseous fluid may be introduced into the formation as a super-critical fluid. Depending on the temperatures and pressures within the formation, the gaseous fluid may either be maintained in the formation as a super-critical fluid or it may become a liquid, a gaseous fluid, or a co-existing liquid and vapor.

The gaseous fluid typically contains carbon dioxide and/or other gaseous fluid components which are relatively more strongly-adsorbing to the carbonaceous material of the formation than methane. Examples of other gaseous fluid components which are typically contained in the introduced gaseous fluid include oxides of sulfur, oxides of nitrogen, and hydrogen sulfide. These relatively more strongly-adsorbing gaseous fluids will preferentially sorb to the carbonaceous material of the formation over any methane which may be present within the formation.

Flue gas is an example of a gaseous fluid which may be disposed of in accordance with the invention. Flue gas typically contains 10 to 25 percent carbon dioxide by volume, from about 75 to 90 percent by volume nitrogen, and small volume percentages of oxides of nitrogen and oxides of sulfur. Another example of a gaseous fluid which may be utilized in the invention is the mixture of gaseous fluids which is rejected by a separation system which is separating carbon dioxide from a natural gas production stream. Typically, the rejected stream contains about 50 to 95 percent by volume carbon dioxide with the rest of the gaseous fluid being comprised mainly of methane. The rejected stream may also contain some hydrogen sulfide, oxides of nitrogen, and oxides of sulfur.

The Solid Carbonaceous Subterranean Formation

A solid carbonaceous subterranean formation utilized in the invention is preferably depleted of recoverable methane, more preferably substantially depleted of recoverable methane, most preferably essentially depleted of recoverable methane. A formation which is depleted of recoverable methane is preferably utilized because the preferential sorption of fluids such as carbon dioxide to a solid carbonaceous subterranean formation will be enhanced within a formation which has an initially lower concentration of methane sorbed to its carbonaceous matrix. Also, if the pressure of the formation is reduced and the formation is depleted of recoverable methane, substantial quantities of gaseous fluids which are relatively weaker adsorbing than methane may be efficiently disposed of within the formation.

A formation which is depleted of recoverable methane still contains some methane, but the methane is at such concentration that it is not economical to recover it from the formation. A formation which is depleted of recoverable methane has had at least 25 volume percent of the original methane in place removed from the formation. A formation which is substantially depleted of recoverable methane has had at least 50 volume percent of the original methane in place removed from the formation. A formation which is essentially depleted of recoverable methane has had at least 70 volume percent of the original methane in place removed from the formation.

One method for producing methane from a formation utilizes pressure depletion of the formation. The reduction of pressure within the formation causes methane to desorb from the carbonaceous material and flow to a production well where it can be recovered. A coal seam which is producing methane through a production well using primary depletion will typically be abandoned when from 25% to about 70% of the original methane in place has been recovered. The typical abandonment pressures for such primary depletion wells range from 100 p.s.i.a. to about 300 p.s.i.a.

Methane can also be recovered from coal seams using enhanced recovery techniques. An example of an enhanced recovery technique which can efficiently remove methane from a coal seam is the use of a nitrogen enriched stream to desorb methane from a coal seam. For a coal seam which is using nitrogen enhanced recovery techniques, the percentage of methane recoverable from a seam is primarily dependent on the volume percentage of nitrogen contained in the production stream recovered from the formation. The production wells are typically abandoned once the percentage of nitrogen becomes too high and/or the percentage of methane becomes too low to justify further recovery. With current nitrogen/methane separation technology, a production well will typically be abandoned when the volume percentage of methane in the effluent recovered from the formation is from 25% to about 50%. This corresponds to recovery of from 45% to about 70% of the original methane in place within the formation. It should be noted that as more efficient methods are developed to separate methane from nitrogen, the amount of methane recoverable from a formation will increase. When a formation has used nitrogen to enhance the recovery of methane from the formation, it may be preferable to reduce the pressure in the formation prior to disposing of an unwanted gaseous fluid component within the seam.

Another enhanced recovery technique which can effectively recovery methane from a solid carbonaceous subterranean formation is carbon dioxide enhanced recovery. In this technique, a carbon dioxide-containing gaseous fluid is introduced into a coal seam or other solid carbonaceous subterranean formation. The carbon dioxide-containing fluid desorbs methane from the formation so that it may be recovered from a production well. The percentage of methane which can be recovered from a coal seam utilizing a carbon dioxide-containing gas varies with differing percentages of carbon dioxide contained in the carbon dioxide-containing gaseous fluid which is introduced into the formation. The percentage of methane recoverable from such a seam is believed to be from about 82% to about 93% of the original methane in place. If a formation has been depleted of methane by carbon dioxide enhanced recovery techniques, it is preferable to reduce the amount of carbon dioxide in the formation prior to attempting to dispose of an unwanted gaseous fluid component within the seam. This can be accomplished by flowing back the formation to remove at a portion of the carbon dioxide sorbed to the formation. The removal of carbon dioxide from the formation will also reduce the pressure within the formation. This reduction of the pressure will aid in disposing of unwanted gaseous fluid components within the formation. It also will provide a relatively pure carbon dioxide effluent which can be utilized in processes such as the enhanced recovery of oil.

Because carbon dioxide is relatively less stronger adsorbing than hydrogen sulfide and some oxides of nitrogen and some oxides of sulfur, it may be preferable to reduce the pressure within the formation sufficiently to desorb the carbon dioxide from the formation, but not enough to cause hydrogen sulfide, oxides of nitrogen, and oxides of sulfur to desorb from the carbonaceous matrix. This technique can also be utilized in the current invention when disposing of gaseous fluids which are comprised of carbon dioxide and other constituents, such as hydrogen sulfide. In these situations, it may be preferable to vent the formation sufficiently to desorb a portion of the sorbed carbon dioxide while maintaining a majority of the other constituents sorbed to the carbonaceous matrix. This will allow a greater quantity of the other constituents, such as hydrogen sulfide, oxides of sulfur, and/or oxides of nitrogen, to be disposed of within a formation.

In other situations, it may be preferable to utilize solid carbonaceous subterranean formations from which methane has never been produced. It may not be attractive to produce methane from such formations. Examples of such formations include formations with low original methane in place and formations with low permeability.

Introduction of Gaseous Fluid Into a Solid Carbonaceous Subterranean Formation

As the gaseous fluid is introduced into the formation, the stronger adsorbing fluids will be preferentially sorbed to the region of the carbonaceous matrix surrounding the injection well over relatively weaker adsorbing fluids. The stronger adsorbing fluids will continue to sorb to the matrix in the region until the matrix is saturated with stronger adsorbing fluid. Any relatively weaker adsorbing fluids, which may be present within the formation, will not sorb as strongly to the matrix and therefore will migrate within the formation toward regions of lower pressure. In general, as gaseous fluid is injected into the formation, the region within the formation which is saturated with stronger adsorbing fluid is continually expanding away from the injection well.

The saturation level of any gaseous fluid component on the carbonaceous material of a formation is dependent on several factors including: the relative adsorption strength of the stronger adsorbing fluids to the carbonaceous matrix as compared to the adsorption strength of the other fluids within the formation, the relative concentration of the stronger adsorbing fluids contained within the injected gaseous fluid introduced into the formation, the capacity of a carbonaceous material for sorbing a particular gaseous fluid component, and the pressure and temperature prevalent within the formation.

For example, a typical San Juan Fruitland formation coal, which is totally depleted of methane, will sorb approximately 789 standard cubic foot (SCF) of gas per ton of coal at 1500 p.s.i.a. and 115° F., when the coal is allowed to reach saturation with a gaseous fluid containing 85 volume percent carbon dioxide and 15 volume percent nitrogen. The sorbed phase on the coal will comprise approximately 99 volume percent carbon dioxide and approximately 1 volume percent nitrogen. When the coal is allowed to reach saturation with a gaseous fluid containing 50 volume percent carbon dioxide and 50 volume percent nitrogen at the same temperature and pressure conditions, the coal will sorb approximately 703 SCF of gas per ton of coal. The sorbed phase will comprise approximately 93 volume percent carbon dioxide and approximately 7 volume percent nitrogen. For a gaseous fluid containing 15 volume percent carbon dioxide and 85 volume percent nitrogen at the same temperature and pressure, the coal will sorb approximately 489 SCF of gas per ton of coal, the sorbed phase being comprised of approximately 70 volume percent carbon dioxide and approximately 30 volume percent nitrogen. For a gaseous fluid containing 70 volume percent carbon dioxide and 30 volume percent methane at the same temperature and pressure, the coal will sorb approximately 747 SCF of gas per ton of coal, with the sorbed phase comprising approximately 86 volume percent carbon dioxide and approximately 14 volume percent methane. The above calculated saturation levels are developed with the assumption that an unlimited quantity of gaseous fluid is available to the coal and that the weaker adsorbing gaseous fluid components are continually flowing by the sample and being replaced by fresh gaseous fluid so that additional stronger adsorbing gaseous fluid components can be preferentially sorbed to the coal. The enrichment of strongly adsorbing fluid in the sorbed phase is a result of the preferential sorption which occurs within a solid carbonaceous subterranean formation. A coal which is totally depleted of methane correlates to a coal seam which has less than approximately 10 volume percent of the original methane in place still remaining within the seam.

The above listed saturation levels for a particular unwanted gaseous fluid component are hereinafter referred to as "disposal saturation levels." The disposal saturation levels for a particular unwanted gaseous fluid component are calculated for a given temperature and pressure. The pressure and temperature, along with other operating parameters which are utilized to dispose of unwanted gaseous fluid components within the formation are referred to as disposal conditions. The disposal conditions are manipulated to maximize the quantity of unwanted gaseous fluid component which is sorbed to the formation. Typically, the disposal conditions are such that between 10 and 99 volume percent of an introduced unwanted gaseous fluid component is disposed of within the formation. In some instances, it is believed that greater than 99 volume percent of an unwanted gaseous fluid component can be disposed of within the formation. By disposing the unwanted gaseous fluid component within the formation, the unwanted gaseous fluid component's release to the atmosphere is prevented. Typically, maintaining disposal conditions requires only closing and/or controlling effluent paths from the formation to prevent the unwanted gaseous fluid component from being released from the formation while maintaining the pressure within the formation preferably below the parting pressure of the formation. In some instances, it may be advantageous to periodically dewater the formation to maintain or increase the formations capacity to sorb an unwanted gaseous fluid component. In some instances it may be advantageous to raise the temperature prevalent within the formation. An example of a situation where it can be preferable to raise the temperature within the formation is where the unwanted gaseous fluid component chemically reacts with the formation and the reaction becomes more favorable as temperatures within the formation increase.

For a given solid carbonaceous subterranean formation, the disposal saturation levels for a particular unwanted gaseous fluid component can be calculated by using an extended Langmuir adsorption isotherms model and the required empirical data for the given formation. A description of an extended Langmuir adsorption isotherm model and how to utilize it to produce a model similar to the one used by the inventors' is disclosed in L. E. Arri, et. al, "Modeling Coalbed Methane Production with Binary Gas Sorption," SPE 24363, pages 459–472, (1992) Published by the Society of Petroleum Engineers; which is incorporated herein by reference.

It is believed that the disposal saturation levels can be approached within a solid carbonaceous subterranean formation if there exists a method for removing the relatively weaker adsorbing fluid components from the formation so that more of the stronger adsorbing components can be introduced into the formation. The additional stronger adsorbing components will continue to sorb to the formation until the disposal saturation levels are approached within the sorbed phase of the matrix. One way of removing the weaker adsorbing components from the formation would be to intermittently or continuously vent the weaker adsorbing fluids from the formation. It is believed that the formation can be saturated with unwanted gaseous fluid components to from 10 to 99 percent of the disposal saturation levels during the operation of the current invention; preferably, from 50 to 95 percent; more preferably, from 70 to 90 percent.

In general, the pressure utilized by the invention is selected so as to optimize the sorption of the unwanted gaseous fluid component to the carbonaceous matrix of the formation. In general, the higher the pressure utilized, the more gas which can be sorbed by the carbonaceous matrix.

As the gaseous fluid is introduced into a solid carbonaceous subterranean formation, the position of the unwanted gaseous fluid components within the formation, the relative concentration of unwanted gaseous fluid components within the formation, and the ratio of unwanted gaseous fluid components to other injected gaseous fluids are preferably monitored. One method of monitoring the formation involves obtaining samples of effluent from a monitor well. The samples are analyzed using methods known to one of ordinary skill in the art, such as gas chromatography. This monitoring will provide a relative indication of how the injected gaseous fluids are moving within the formation and the degree to which the formation is becoming saturated with the unwanted gaseous fluid component.

If the unwanted gaseous fluid component is a relatively stronger adsorbing fluid than the other injected gaseous fluid components, then the volume ratio of unwanted gaseous fluid component to other injected gaseous fluid components within the effluent sampled at a monitor well will be reduced relative to the volume ratio of unwanted gaseous fluid component to other injected gaseous fluid components within the injected gaseous fluid introduced into the solid carbonaceous subterranean formation.

It believed that this reduction in the ratio of unwanted gaseous fluid components to other injected gaseous fluid components is a result of the preferential sorption of stronger adsorbing fluid components, such as carbon dioxide, within the carbonaceous matrix of the formation. It is believed that the preferential sorption causes the relatively stronger adsorbing fluid components to move more slowly through the formation than weaker adsorbing fluid components. As discussed earlier, as gaseous fluid is introduced into the formation, the region within the formation which is saturated with stronger adsorbing fluid is being expanded away from the injection well. The stronger adsorbing fluid form what approximates a concentration front that advances within the formation. As the gaseous fluid is introduced into the formation, the concentration front is continually being swept from the injection well toward a region of lower pressure within the formation. The enrichment of the sampled effluent with other injected fluids will continue until the concentration front reaches a monitor well.

The ratio of the unwanted gaseous fluid component to other injected gaseous fluid components collected at a monitor well should rapidly increase once the concentration front reaches the region of the formation which the monitor well drains. Due to the heterogeneity of most solid carbonaceous subterranean, the unwanted gaseous fluid component can move unevenly within the formation. This may cause the unwanted gaseous fluid component to become unevenly distributed within the formation. Therefore it is preferably to utilize more than one well to monitor the formation.

In one aspect of the invention, the introduction of gaseous fluid is continued until the formation is saturated to a desired degree with the unwanted gaseous fluid component. One of ordinary skill in the art will be able to determine the degree of saturation of a particular region within the formation by obtaining a gaseous effluent sample from a monitor well which penetrates the region of the formation.

The chemical composition of the obtained sample together with information relating to the pressure within the formation near the monitor well will enable one of ordinary skill in the art to determine the relative concentrations of each of the gaseous components sorbed within the carbonaceous matrix in the region of the formation from which the sample is obtained. This will allow one of ordinary skill in the art to determine if the unwanted gaseous fluid component of the injected gaseous fluid has reached the region from which the sample is obtained. It should also allow one of ordinary skill in the art to determine the degree to which the region of the formation is saturated with the unwanted gaseous fluid component. The desired degree of saturation within the formation is described more fully above in the description relating to disposal saturation levels.

As discussed earlier, if the unwanted gaseous fluid component is a relatively stronger adsorbing fluid, venting the formation will allow a larger quantity of unwanted gaseous fluid component to be sorbed to the formation for any given disposal pressure. The venting can take place through any well which is in fluid communication with the formation. Venting, if utilized, may be performed continuously or intermittently, and it may take place simultaneously with injection of gaseous fluid or it may occur after the injection of gaseous fluid has ceased.

The injection of gaseous fluid into the formation can be intermittent or continuous. The injection of gaseous fluid is typically continued until the desired pressure is reached. After a desired quantity of gaseous fluid has been introduced into the formation or the formation has attained a desired pressure, the injection well is shut-in and the formation is preferably maintained at sufficient disposal conditions to maintain from 40 to 80 volume percent of the unwanted gaseous fluid components sorbed to the formation; preferably to maintain the unwanted gaseous fluid components sorbed to the formation for at least one year after ceasing to introduce gaseous fluids into the solid carbonaceous subterranean formation.

Alternatively, the method of the invention is ceased after the formation has been saturated with the unwanted gaseous fluid to a desired degree. In carrying out the invention, it is preferable that less than 50 volume percent of the total quantity of unwanted gaseous fluid component introduced into the formation be allowed to escape to the atmosphere; more preferably less than 10 volume percent, most preferably less than one percent. The unwanted gaseous fluid components preferably are maintained within the formation for at least one year, more preferably at least five years, most preferably at least ten years.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made and materials may be substituted for those described in the application. For example, a solid carbonaceous subterranean formation utilized in the invention may be penetrated by production wells as described in co-pending patent application entitled: "A METHOD FOR TREATING A MIXTURE OF GASEOUS FLUIDS WITHIN A SOLID CARBONACEOUS SUBTERRANEAN FORMATION", filed Apr. 1, 1994, Ser. No. 08/222,743, which is hereby incorporated by reference.

Thus, it will be appreciated that various modifications, alternatives, variations, etc., may be made without departing from the spirit and scope of the invention as defined in the appended claims. It is, of course, intended that all such modifications are covered by the appended claims.

We claim:

1. A method for disposing of an unwanted gaseous fluid component within a solid carbonaceous subterranean formation, the method comprising the steps of:

a) introducing a gaseous fluid, comprising the unwanted gaseous fluid component, into the formation to sorb the unwanted gaseous fluid component to the formation; and b) maintaining disposal conditions within the formation to ensure that at least 10 percent of a disposal saturation level of an unwanted gaseous fluid component remains sorbed to the formation.

2. The method of claim 1, wherein from about 40 to about 80 volume percent of the unwanted gaseous fluid component sorbed to the formation remain sorbed to the formation after one year.

3. The method of claim 1, wherein at least 50 volume percent of the unwanted gaseous fluid component sorbed to the formation remain sorbed to the formation after one year.

4. The method of claim 1, wherein the solid carbonaceous subterranean formation is depleted of recoverable methane.

5. The method of claim 4, wherein the unwanted gaseous fluid component comprises carbon dioxide.

6. The method of claim 4, wherein the gaseous fluid introduced in step a) comprises flue gas and the unwanted gaseous fluid component sorbed to the formation is selected from the group consisting of oxides of nitrogen, oxides of sulfur, and mixtures thereof.

7. A method for disposing of an unwanted gaseous fluid component within a coal seam, the method comprising the steps of:

a) introducing a gaseous fluid, containing the unwanted gaseous fluid component, into the coal seam; and b) ceasing to introduce the gaseous fluid into the coal seam when the coal seam becomes saturated to a desired degree with the unwanted gaseous fluid component.

8. The method of claim 7, wherein the gaseous fluid is ceased to be introduced when the coal seam becomes saturated with unwanted gaseous fluid component from 50 to about 95 percent of a disposal saturation level.

9. The method of claim 7, wherein the gaseous fluid is ceased to be introduced into the coal seam when the coal seam becomes saturated with unwanted gaseous fluid component from 70 to about 90 volume percent of a disposal saturation level.

10. The method of claim 7, wherein the unwanted gaseous fluid component comprises carbon dioxide.

11. The method of claim 7, wherein the gaseous fluid introduced into the coal seam comprises flue gas and the unwanted gaseous fluid component is selected from the group consisting of oxides of nitrogen, oxides of sulfur, and mixtures thereof.

12. A method for disposing of an unwanted gaseous fluid component, the method comprising the step of:

injecting a gaseous fluid, comprising the unwanted gaseous fluid component, into a coal seam which is depleted of recoverable methane under disposal conditions to cause the unwanted gaseous fluid component to sorb to the coal seam.

13. The method of claim 12, wherein a total pressure from about 50 to 2000 p.s.i.a. above an initial reservoir pressure of the coal seam is established on the coal seam to facilitate the sorption of unwanted gaseous fluid components to the coal seam.

14. The method of claim 13, wherein the total pressure established on the coal seam is less than a parting pressure of the coal seam.

15. The method of claim 13, wherein the unwanted gaseous fluid component is selected from the group consisting of oxides of nitrogen, oxides of sulfur, hydrogen sulfide, and mixtures thereof.

16. The method of claim 12, wherein at least 50 volume percent of the unwanted gaseous fluid component introduced into the coal seam is sorbed to the coal seam.

17. The method of claim 12, wherein at least 90 volume percent of the unwanted gaseous fluid component introduced into the coal seam is sorbed to the coal seam.

18. The method of claim 12, wherein at least 99 volume percent of the unwanted gaseous fluid component introduced into the coal seam is sorbed to the coal seam.

19. The method of claim 12, wherein the gaseous fluid injected into the coal seam further comprises a weaker adsorbing fluid component, and the method further comprises the step of:

withdrawing an effluent enriched in the weaker adsorbing fluid component to increase the quantity of unwanted gaseous fluid component which can sorb to the coal seam.

20. The method of claim 19, further comprising:

repeating the injecting and withdrawing steps.

21. The method of claim 12, wherein the coal seam is substantially depleted of recoverable methane.

22. The method of claim 12, wherein the coal seam is essentially depleted of recoverable methane.

* * * * *